United States Patent
Key et al.

(10) Patent No.: US 7,843,828 B2
(45) Date of Patent: Nov. 30, 2010

(54) METHODS AND SYSTEMS FOR ALLEVIATING NETWORK CONGESTION

(75) Inventors: Peter B. Key, Cambridge (GB); Laurent Massoulie, Cambridge (GB); Koenraad Laevens, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1744 days.

(21) Appl. No.: 10/857,687

(22) Filed: May 27, 2004

(65) Prior Publication Data

US 2009/0161546 A1 Jun. 25, 2009

Related U.S. Application Data

(63) Continuation of application No. 09/654,737, filed on Sep. 5, 2000, now Pat. No. 6,842,424.

(51) Int. Cl.
 *H04L 12/26* (2006.01)
(52) U.S. Cl. .......................... 370/235; 370/230; 370/252
(58) Field of Classification Search .................. 370/230, 370/230.1, 231, 232, 233, 234, 235, 235.1, 370/236, 236.1, 236.2, 237, 238
See application file for complete search history.

(56) References Cited

U.S. PATENT DOCUMENTS

| | | | | |
|---|---|---|---|---|
| 5,831,971 A | * | 11/1998 | Bonomi et al. | 370/230 |
| 5,936,940 A | * | 8/1999 | Marin et al. | 370/232 |
| 5,995,486 A | * | 11/1999 | Iliadis | 370/229 |
| 6,219,704 B1 | | 4/2001 | Kim et al. | |
| 6,252,851 B1 | | 6/2001 | Siu et al. | |
| 6,477,143 B1 | * | 11/2002 | Ginossar | 370/230 |
| 6,512,743 B1 | * | 1/2003 | Fang | 370/232 |
| 6,594,241 B1 | * | 7/2003 | Malmlof | 370/329 |
| 7,277,709 B2 | * | 10/2007 | Vadgama | 455/453 |
| 7,369,498 B1 | * | 5/2008 | Ma et al. | 370/235 |
| 7,480,304 B2 | * | 1/2009 | Yeh et al. | 370/398 |
| 2005/0053081 A1 | * | 3/2005 | Andersson et al. | 370/401 |

(Continued)

FOREIGN PATENT DOCUMENTS

EP 0576122 12/1993

OTHER PUBLICATIONS

Jagannathan, et al.; "Predictive congestion control of ATM networks: multiple sources/single buffer scenario" IEEE; vol. 1, Dec. 12, 2000; pp. 47-52; XP010536728.

(Continued)

*Primary Examiner*—Chi H. Pham
*Assistant Examiner*—Kevin Mew

(57) ABSTRACT

Methods and systems for detecting and predicting congestion patterns from network feedback are described. In the inventive embodiments, network feedback in the form of binary feedback messages is received. The network feedback can comprise any suitable feedback messages and, in the illustrated and described embodiments comprise packet loss events or ECN marks, to name just a few. The inventive embodiment uses the network feedback to predict when congestion is likely to occur in the future. Based on these predictions, the behavior of end users within the system can be modified so that congestion is reduced. Specifically, the data packets that are typically transmitted by the end users can be delayed until such a time when the predicted congestion is mitigated. Thus, the inventive systems and methods take a predictive, proactive approach to addressing network congestion issues, rather than a reactive approach.

37 Claims, 13 Drawing Sheets

U.S. PATENT DOCUMENTS

2006/0146711 A1* 7/2006 Anbarani .................. 370/235

OTHER PUBLICATIONS

Key, et al; "Congestion pricing for congestion avoidance"; Microsoft Technical Report; 'online!; Feb. 1999 (Feb. 1990), XP002259973; Retrieved from the Internet: <URL:www.microsoft.com>; p. 2, paragraph 2.1.ECN; p. 4, paragraph 2.3.An.Example.Strategy.Compared. To.TCP.

Randhawa, et al.; "Application of AR Based Model in Proactive Management of VBR Traffic"; 1998 1st IEEE International Conference on ATM. ICA TM '98. Conference Proceedings. Colmar, France, Jun. 22-24, 1998; pp. 234-241.

Ait-Hellal O et al.; "Analysis of TCP Vegas and TCP Reno" Communications, 1997; ICC '97 Montreal, Towards the Knowledge Millennium. 1997 IEEE International Conference on Montreal, Que., Canada Jun. 8-12, 1997, New York.

Li Lei et al; "An adaptive model of RED/ECN parameters" IEEE, vol. 1, Aug. 21, 2000; pp. 707-711, XP010526842; p. 708, paragraph 2.RED.ECN.Algorithm.

Ab-Hamid K et al.; "Kalman Prediction Method for Congestion Avoidance in ISDN Frame-Relay Networks"; Proceedings of the Annual International Phoenix Conference on Computers and Communications; Scottsdale, Mar. 27-30, 1991.

Randhawa, et al.; "Estimation and Prediction of VBR Traffic in High-Speed Networks using LMS Filters"; 1998. ICC 98, Conference REcord; 1998 IEEE International Conference on Atlanta GA; Jun. 7-11, 1998; New York, NY, pp. 253-258.

Leavens, et al.; "An ECN-based ent-to-end congestion-control framework: experiments and evaluation"; Microsoft Technical Paper; Oct. 2000; XP002273199; pp. 1-12.

Hamann et al., "A New Fair Window Algorithm for ECN Capable TCP (New-ECN)", Mar. 23-30, 2000, IEEE, pp. 1528-1536.

Tokura, et al; "Congestion avoidance networks: CEFLAR. Congestion estimation feedback by limited acceleration-rate/-ratio" Communications; 1994. ICC '94, Supercomm/ICC '94, Conference REcord "Serving Humanity Through Comunications"; IEEE International Conf. on New Orleans, LA; May 1-5, 1994.

Sun et al., "A TCP-Friendly Congestion Control Scheme for Real-time Packet Video Using Prediction ", IEEE, Dec. 5-9, 1999, pp. 1818-1822.

Ait-Hellal et al., "Cycle-Based TCP-Friendly Algorithm", IEEE, 1999, pp. 776-780.

* cited by examiner

| #TCP | #SmoothTCP | per TCP sent rate | marks (%) | per Smooth sent rate | marks (%) | Total inc. background sent | marks |
|---|---|---|---|---|---|---|---|
| 49 | 1 | 67.52 | 0.31 | 72.40 | 0.28 | 3585 | 0.31 |
| 45 | 5 | 68.37 | 0.28 | 72.06 | 0.28 | 3641 | 0.30 |
| 40 | 10 | 69.03 | 0.30 | 69.75 | 0.28 | 3662 | 0.29 |
| 25 | 25 | 71.63 | 0.29 | 71.20 | 0.28 | 3775 | 0.28 |
| 1 | 49 | 67.8 | 0.32 | 75.16 | 0.27 | 3954 | 0.27 |

| #TCP | #PredTCP | per TCP sent rate | marks (%) | per Pred sent rate | marks (%) | Total inc. background sent | marks |
|---|---|---|---|---|---|---|---|
| 49 | 1 | 65 | 0.32 | 62 | 0.3 | 3636 | 0.32 |
| 45 | 5 | 66 | 0.31 | 60 | 0.31 | 3641 | 0.31 |
| 40 | 10 | 66 | 0.31 | 60 | 0.30 | 3636 | 0.31 |
| 25 | 25 | 67 | 0.29 | 63 | 0.28 | 3637 | 0.29 |
| 1 | 49 | 73 | 0.27 | 63 | 0.28 | 3560 | 0.28 |

METHODS AND SYSTEMS FOR ALLEVIATING NETWORK CONGESTION

RELATED APPLICATION

This application is a continuation of and claims priority to U.S. patent application Ser. No. 09/654,737, the disclosure of which is incorporated by reference herein.

TECHNICAL FIELD

This invention relates to methods and systems for alleviating network congestion, and particularly to methods and systems for alleviating network congestion that can be experienced by the Internet due to packet traffic-induced network oscillations.

BACKGROUND

Of the many protocols available for transferring data across networks such as the Internet, TCP/IP (which stands for Transmission Control Protocol/Internet Protocol) is the one most widely accepted. TCP ensures reliable transfers by transmitting data in separate packets. More precisely, TCP segments the data, and a TCP segment with an IP header forms an IP packet. The size of a TCP segment is bounded by the Maximum Segment Size (MSS), which is connection dependent with a default value of 536 bytes. A "sliding window" or "handshake" protocol partitions the transmission into three distinct phases. The first phase represents data ready to be sent. The second phase represents data that is either in transit or has arrived but has not yet been acknowledged. The third phase represents data that arrived successfully and has been acknowledged. Thus a 256 Kb file is broken into a number of packets, each of which passes sequentially through all three phases. An excellent text that provides a discussion of TCP/IP is Comer, *Internetworking with TCP/IP, Volume I: Principles, Protocols, and Architecture* Third Edition.

Not surprisingly, data traffic over networks can be susceptible to congestion. Congestion is a condition of severe delay caused by an overload of packets (or datagrams) at one or more switching points (e.g. at routers). When congestion occurs, delays increase and the router begins to enqueue packets until it can route them. Each router has a finite storage capacity and packets or datagrams have to compete for that storage (i.e. in a datagram-based Internet, there is no preallocation of resources to individual TCP connections). In the worst case, the total number of packets or datagrams arriving at the congested router grows until the router reaches capacity and starts to drop packets.

End points of a communication connection do not usually know the details of where congestion has occurred or why. To them, congestion simply means an increased delay or lost packets. Unfortunately, most transport protocols use timeout and retransmission, so they respond to increased delay or loss by retransmitting packets or datagrams. Retransmissions aggravate congestion instead of alleviating it. If unchecked, the increased traffic will produce increased delay, leading to increased traffic, and so on, until the network becomes useless. This condition is known as "congestion collapse".

To avoid congestion collapse, TCP must reduce transmission rates when congestion occurs. Routers watch queue lengths and use certain techniques to inform hosts that congestion has occurred, but transport protocols like TCP can help avoid congestion by reducing transmission rates automatically whenever delays occur. Of course, algorithms to avoid congestion must be constructed carefully because even under normal operating conditions networks can exhibit wide variation in round trip delays.

To avoid congestion, the TCP standard now recommends using two techniques: slow-start and multiplicative decrease. These techniques are related and can be implemented easily. For each TCP connection, TCP must remember the size of the receiver's window (i.e. a "window" is defined as the buffer size advertised in acknowledgements). To control congestion, TCP maintains a second limit, called the "congestion window limit" or simply the "congestion window". At any time, TCP acts as if the window size is the smaller of (1) the receiver's window, and (2) the congestion window.

In the steady state on a non-congested connection, the congestion window is the same size as the receiver's window. Reducing the congestion window size reduces the traffic TCP will inject into the connection. To estimate congestion window size, TCP assumes that most packet or datagram loss comes from congestion and uses the following strategy:

Multiplicative Decrease Congestion Avoidance: Upon loss of a segment, reduce the congestion window by half (down to a minimum of at least one segment). For those segments that remain in the allowed window, backoff the retransmission timer exponentially.

Because TCP reduces the congestion window by half for every loss, it decreases the window exponentially if loss continues. In other words, if congestion continues, TCP reduces the volume of traffic exponentially and the rate of retransmission exponentially. If loss continues, TCP eventually limits transmission to a single packet or datagram and continues to double timeout values before retransmitting. The idea is to provide a quick and significant traffic reduction to allow routers enough time to clear the packets or datagrams already in their queues.

To recover from congestion, one might think that this process is simply reversed and that the congestion window is doubled when traffic begins to flow again. However, doing so produces an unstable system that oscillates wildly between no traffic and congestion. Instead, TCP uses a technique called slow-start to scale up transmission:

Slow-Start (Additive) Recovery: Whenever starting traffic on a new connection or increasing traffic after a period of congestion, start the congestion window at the size of a single segment and increase the congestion window by one segment each time an acknowledgement arrives.

Slow-start avoids swamping the Internet with additional traffic immediately after congestion clears or when new connections suddenly-start.

The term "slow start" may be a misnomer because under ideal conditions, the start is not very slow. TCP initializes the congestion window to 1, sends an initial segment, and waits. When the acknowledgement arrives, it increases the congestion window to 2, sends two segments and waits. When the two acknowledgements arrive they each increase the congestion window by 1, so TCP can send 4 segments. Acknowledgements for those will increase the congestion window to 8. Within four round-trip times, TCP can send 16 segments, often enough to reach the receiver's window limit. Even for extremely large windows, it takes only $\log_2 N$ round trips before TCP can send N segments.

To avoid increasing the window size too quickly and causing additional congestion, TCP adds one additional restriction. Once the congestion window reaches one half of its original size before congestion, TCP enters a congestion avoidance phase and slows down the rate of the increment. During congestion avoidance, it increases the congestion window by 1 only if all segments in the window have been acknowledged. This is known as a linear increase phase.

Taken together, the slow-start increase, linear increase and multiplicative decrease behaviour of congestion avoidance, and exponential timer backoff improve the performance without adding any significant computational overhead to the protocol software.

Thus, it has been recognized for some time that TCP traffic sources tend to synchronize their behavior, producing oscillations in buffer occupancy levels at the bottleneck links of the networks. These oscillations are not desirable, as they are likely to imply greater queuing delays, or more packet loss, for a given level of bandwidth utilization.

Random Early Detection ("RED") has been proposed to desynchronize TCP sources, and hence reduce the impact of these oscillations. RED is discussed in detail in Floyd and Jacobson, *Random early detection gateways for congestion avoidance*, IEEE/ACM Trans. On Networking, 1(4), 1993. RED attempts to reduce the impact of oscillations by smoothing the binary feedback signals sent by the congested buffer resource. Such binary feedback signals can take the form of packet loss events, or Early Congestion Notification (ECN) marks. See, for example, Floyd, *TCP and explicit congestion notification*, ACM Computer Communication Review, 24 pp. 10-23, 1994. Many variations of this initial proposal have been suggested and some recent work addressed the delicate issue of how to tune RED parameters to obtain maximal efficiency. See, for example, Firoiu and Borden, *A study of active queue management for congestion control*, Infocom 2000. A complementary proposal proposes the use of ECN marks which advocates marking packets instead of dropping them at times an active buffer management decision is made, informing the sources to back-off while avoiding unnecessary packet transmissions.

From ongoing work on implementations of RED and its variants, it appears that the achieved oscillation reduction in buffer occupancy is not as dramatic as was initially expected. One could reasonably argue that the rules proposed for deciding when to mark or drop packets can be further improved.

Accordingly, this invention arose out of concerns associated with improving the methods and systems that are used to address network congestion issues, particularly in the environment of the Internet.

SUMMARY

Methods and systems for detecting and predicting congestion patterns from network feedback are described. In the inventive embodiments, network feedback in the form of binary feedback messages is received. The network feedback can comprise any suitable feedback messages and, in the illustrated and described embodiments comprise packet loss events or ECN marks, to name just a few. The inventive embodiment uses the network feedback to predict when congestion is likely to occur in the future. Based on these predictions, the behavior of end users within the system can be modified so that congestion is reduced. Specifically, the data packets that are typically transmitted by the end users can be delayed until such a time when the predicted congestion is mitigated. Thus, the inventive systems and methods take a predictive, proactive approach to addressing network congestion issues, rather than a reactive approach.

DETAILED DESCRIPTION

Overview

Methods and systems for detecting and predicting congestion patterns from network feedback are described. In the inventive embodiments, network feedback in the form of binary feedback messages is received. The network feedback can comprise any suitable feedback messages and, in the illustrated and described embodiments comprise packet loss events or ECN marks, to name just a few. The feedback can be received by relying on the return path of TCP if, for example, loss events or ECN marks are used. The inventive embodiment uses the network feedback to predict when congestion is likely to occur in the future. Based on these predictions, the behavior of end users within the system can be modified so that congestion is reduced. Specifically, the data packets that are typically transmitted by the end users can be delayed until such a time when the predicted congestion is mitigated. Thus, the inventive systems and methods take a predictive, proactive approach to addressing network congestion issues, rather than a reactive approach typified by the systems mentioned in the "Background" section above.

Exemplary Operating Environment

Figure 1:
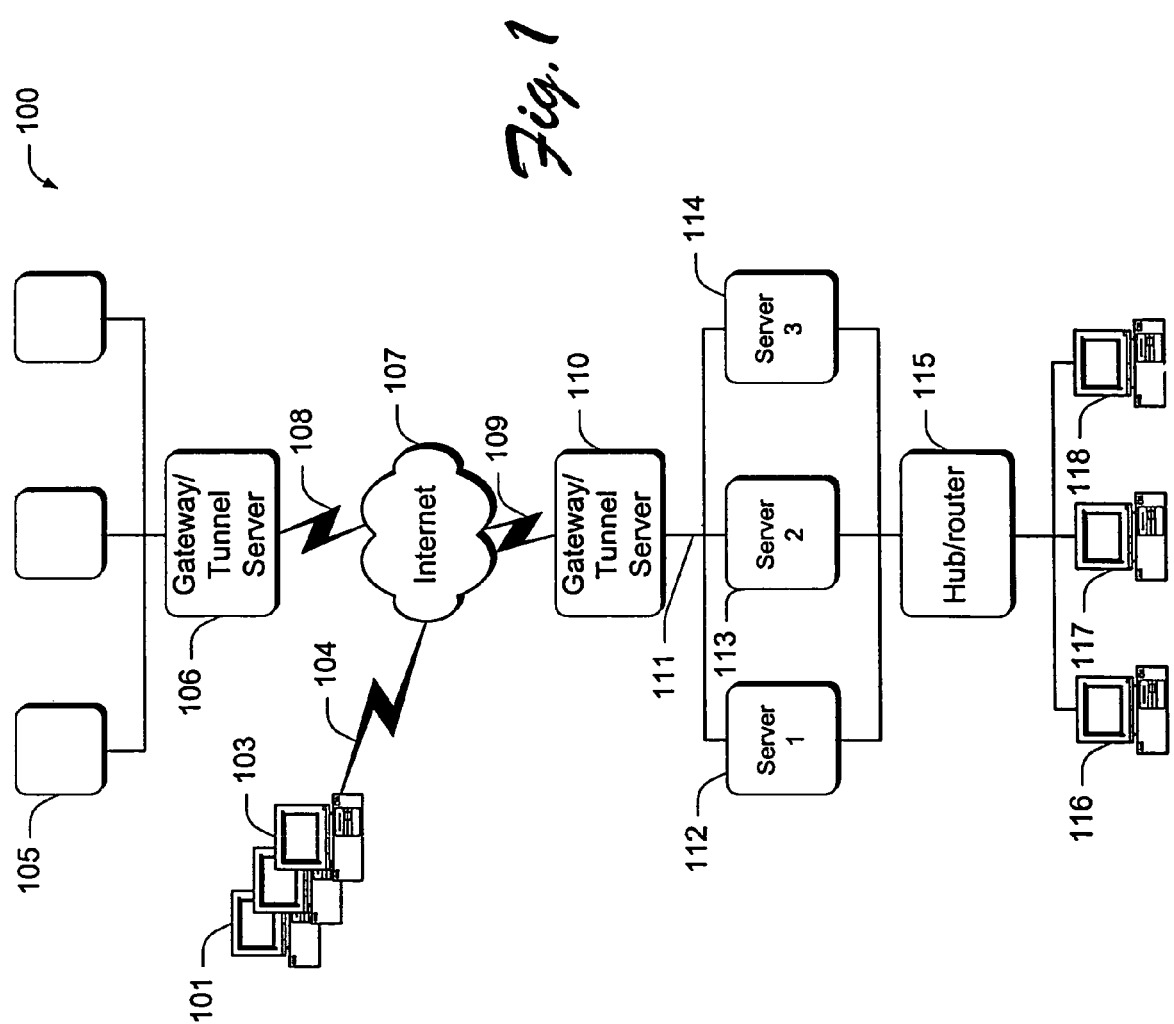
FIG. 1 is a block diagram of an exemplary network in which the inventive embodiments can be employed.

One exemplary operating environment in which the described embodiments can operate encompasses a general distributed computing environment which can include, generally, local area networks with hubs, routers, gateways, tunnel-servers, applications servers, etc. connected to other clients and other networks via the Internet. Some of the elements of a typical internet network configuration are shown in FIG. 1, and include a number of client machines 105 connected to a Gateway/hub/tunnel-server/etc. 106 which is itself connected to the internet 107 via some internet service provider (ISP) connection 108. Also shown are other possible clients 101, 103 similarly connected to the internet 107 via an ISP connection 104, with these units communicating to possibly a home office via an ISP connection 109 to a gateway/tunnel-server 110 which is connected at 111 to various enterprise application servers 112, 113, 114 which could be connected through another hub/router 115 to various local clients 116, 117, 118. It will be appreciated that this constitutes but one exemplary network computing environment in which the inventive embodiments can be employed.

Exemplary Computing Environment

The network environment shown above is made up of a number of computing units. The individual computing units can be described by the computing unit of FIG. 2.

Figure 2:
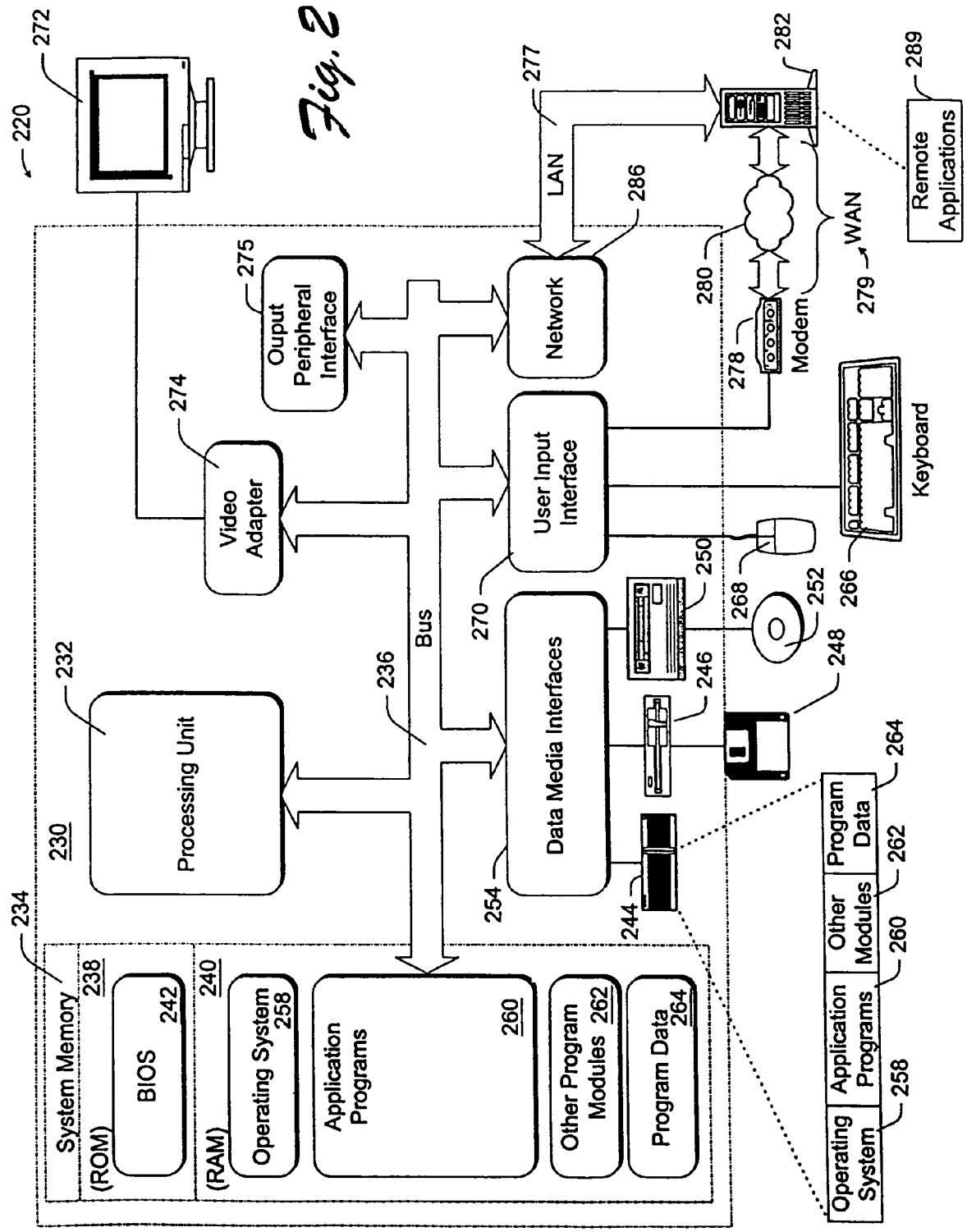
FIG. 2 is a block diagram of a computer system that is suitable for use in implementing the described embodiments.

FIG. 2 illustrates an example of a suitable computing environment 220 on which the inventive techniques described below can be implemented.

Exemplary computing environment 220 is only one example of a suitable computing environment and is not intended to suggest any limitation as to the scope of use or functionality of the described techniques. Neither should the computing environment 220 be interpreted as having any dependency or requirement relating to any one or combination of components illustrated in the exemplary computing environment 220.

The described techniques can be operational with numerous other general purpose or special purpose computing system environments or configurations. Examples of well known computing systems, environments, and/or configurations that may be suitable for use with the described techniques include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The described techniques can be described in the general context of computer-executable instructions, such as program modules, being executed by a computer. Generally, program modules include routines, programs, objects, components, data structures, etc. that perform particular tasks or implement particular abstract data types. The described techniques can also be practiced in distributed computing environments where tasks are performed by remote processing devices that are linked through a communications network. In a distributed computing environment, program modules can be located in both local and remote computer storage media including memory storage devices.

As shown in FIG. 2, the computing environment 220 includes a general-purpose computing device in the form of a computer 230. The components of computer 220 can include, but are not limited to, one or more processors or processing units 232, a system memory 234, and a bus 236 that couples various system components including the system memory 234 to the processor 232.

Bus 236 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 230 typically includes a variety of computer readable media. Such media can be any available media that is accessible by computer 230, and includes both volatile and non-volatile media, removable and non-removable media.

In FIG. 2, the system memory includes computer readable media in the form of volatile memory, such as random access memory (RAM) 240, and/or non-volatile memory, such as read only memory (ROM) 238. A basic input/output system (BIOS) 242, containing the basic routines that help to transfer information between elements within computer 230, such as during start-up, is stored in ROM 238. RAM 240 typically contains data and/or program modules that are immediately accessible to and/or presently operated on by processor 232.

Computer 230 can further include other removable/non-removable, volatile/non-volatile computer storage media. By way of example only, FIG. 2 illustrates a hard disk drive 244 for reading from and writing to a non-removable, non-volatile magnetic media (not shown and typically called a "hard drive"), a magnetic disk drive 246 for reading from and writing to a removable, non-volatile magnetic disk 248 (e.g., a "floppy disk"), and an optical disk drive 250 for reading from or writing to a removable, non-volatile optical disk 252 such as a CD-ROM, DVD-ROM or other optical media. The hard disk drive 244, magnetic disk drive 246, and optical disk drive 250 are each connected to bus 236 by one or more interfaces 254.

The drives and their associated computer-readable media provide nonvolatile storage of computer readable instructions, data structures, program modules, and other data for computer 230. Although the exemplary environment described herein employs a hard disk, a removable magnetic disk 248 and a removable optical disk 252, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 248, optical disk 252, ROM 238, or RAM 240, including, by way of example, and not limitation, an operating system 58, one or more application programs 260, other program modules 262, and program data 264.

A user can enter commands and information into computer 230 through input devices such as keyboard 266 and pointing device 268 (such as a "mouse"). Other input devices (not shown) may include a microphone, joystick, game pad, satellite dish, serial port, scanner, or the like. These and other input devices are connected to the processing unit 232 through an user input interface 270 that is coupled to bus 236, but may be connected by other interface and bus structures, such as a parallel port, game port, or a universal serial bus (USB).

A monitor 272 or other type of display device is also connected to bus 236 via an interface, such as a video adapter 274. In addition to the monitor, personal computers typically include other peripheral output devices (not shown), such as speakers and printers, which may be connected through output peripheral interface 275.

Computer 230 may operate in a networked environment using logical connections to one or more remote computers, such as a remote computer 282. Remote computer 282 may include many or all of the elements and features described herein relative to computer 230.

Logical connections shown in FIG. 2 are a local area network (LAN) 277 and a general wide area network (WAN) 279. Such networking environments are commonplace in offices, enterprise-wide computer networks, intranets, and the Internet.

When used in a LAN networking environment, the computer 230 is connected to LAN 277 network interface or adapter 286. When used in a WAN networking environment, the computer typically includes a modem 278 or other means for establishing communications over the WAN 279. The modem 278, which may be internal or external, may be connected to the system bus 236 via the user input interface 270, or other appropriate mechanism.

Depicted in FIG. 2, is a specific implementation of a WAN via the Internet. Over the Internet, computer 230 typically includes a modem 278 or other means for establishing communications over the Internet 280. Modem 278, which may be internal or external, is connected to bus 236 via interface 270.

In a networked environment, program modules depicted relative to the personal computer 230, or portions thereof, may be stored in a remote memory storage device. By way of example, and not limitation, FIG. 2 illustrates remote application programs 289 as residing on a memory device of remote computer 282. It will be appreciated that the network connections shown and described are exemplary and other means of establishing a communications link between the computers may be used.

FIG. 2 illustrates an example of a suitable operating environment 220 in which the described techniques can be implemented. Specifically, the described techniques can be implemented by any program 260-262 or operating system 258 in FIG. 2.

The operating environment is only an example of a suitable operating environment and is not intended to suggest any limitation as to the scope of use of functionality of the described techniques. Other well known computing systems, environments, and/or configurations that may be suitable for use with the described techniques include, but are not limited to, personal computers, server computers, hand-held or laptop devices, multiprocessor systems, microprocessor-based systems, programmable consumer electronics, wireless communications equipment, network PCs, minicomputers, mainframe computers, distributed computing environments that include any of the above systems or devices, and the like.

An implementation of the described techniques can be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of the described techniques can be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Synchronized TCP Sources and Oscillations

Figure 3:
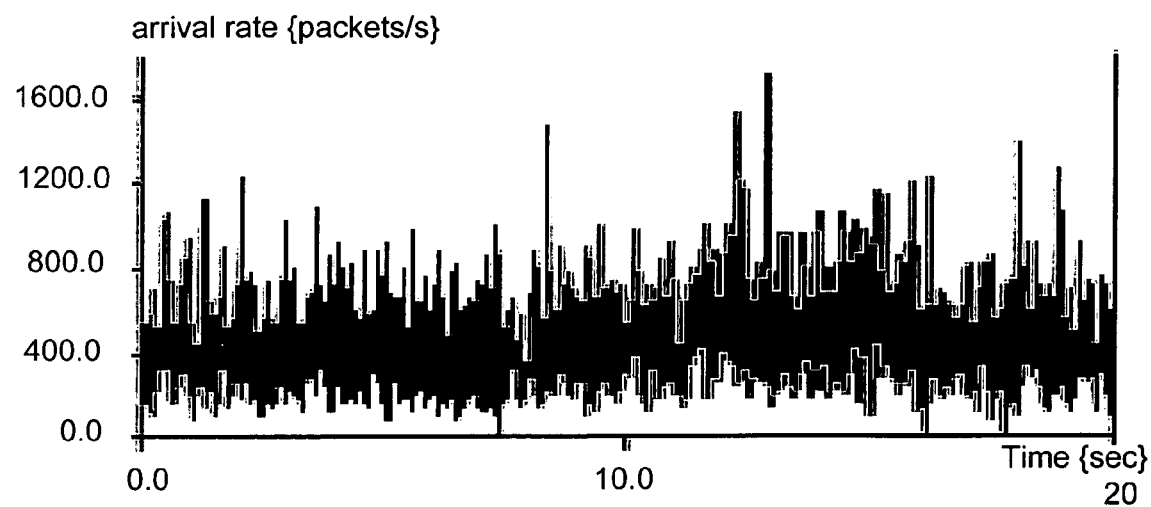
FIG. 3 is a graph that describes the arrival rate of background traffic.

The discussion in this section pertains to a simulation that helps to illustrate the oscillatory nature of the networking environment in which the inventive embodiments can be employed. The simulation that is described consists of the following: A single bottleneck link, with a capacity of 4000 packets per second (i.e., 32 Mb/s for a nominal packet size of 1 kB), carries some background, unreactive traffic, as shown in FIG. 3, which uses about 10% of the total bandwidth. In addition, 50 reactive users are competing for the remaining bandwidth. They all have a round-trip propagation delay equal to 0.1 second. Packets receive an ECN mark at the bottleneck resource if, upon their departure from the bottleneck queue, there are at least 10 packets queued behind them. The queue length is set sufficiently high (e.g. 500 packets), so that loss never occurs.

Figure 4:
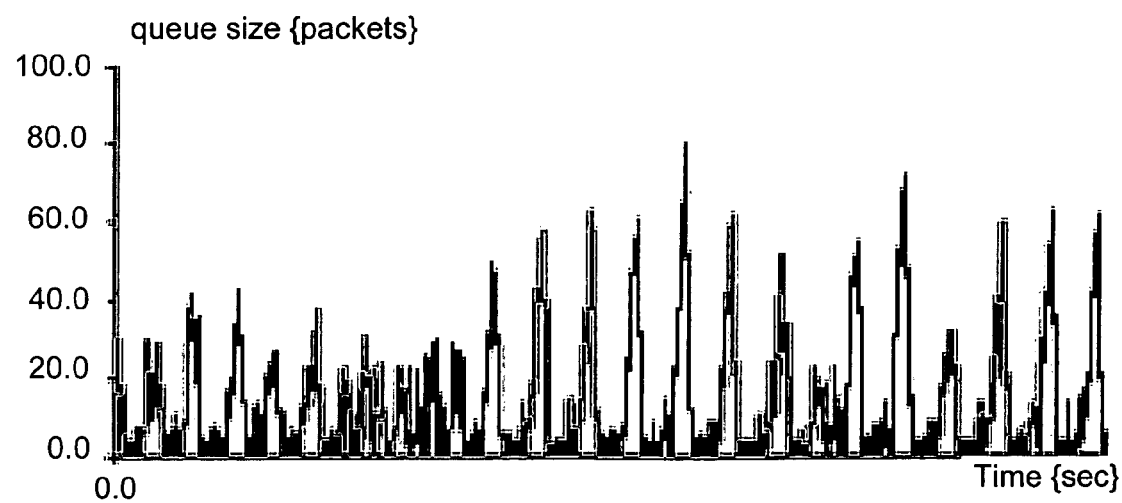
FIG. 4 is a graph that describes oscillations in a queue size.

When all 50 users implement ECN-aware TCP, the queue size behaves as in FIG. 4. Synchronization and oscillatory behavior is clearly visible. To illustrate this effect further, consider the process given the number of marks generated by the bottleneck, sampled every millisecond (in which case there can be between 0 to 4 marks in an interval).

Figure 5:
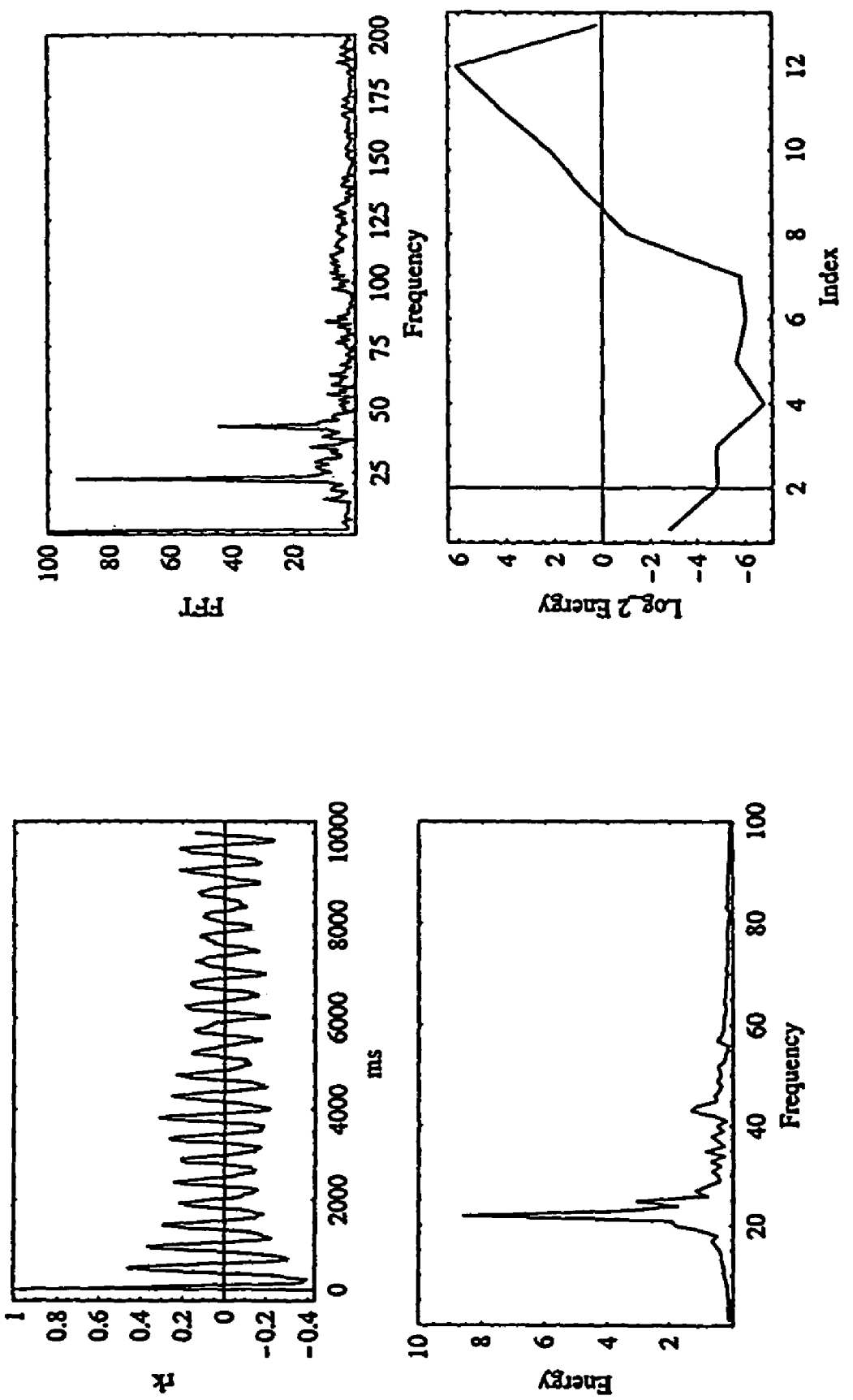
FIG. 5 contains four graphs that describe data analysis for aggregate marks.

FIG. 5 plots the time and frequency analysis. The top left of the figure is the correlogram (the autocorrelation function), and the top right the corresponding periodogram (transform of the correlogram) for a 10-second snapshot of the data. The bottom left diagram is the raw Fast Fourier transform of the data, and the bottom right the energy levels of a discrete Wavelet transform using the Haar Wavelet, based on the finer initial sampling ensuring that the number of marks per interval is 0 or 1.

All of these figures convey the same message—there is a strong periodic component in the "marks" signal, with both positive and negative correlations, and the strongest period of oscillation in this set up is about 0.5 seconds (several round trip times). More precisely, from the periodogram, the strongest signal is at a frequency of 23 cycles per 10 seconds interval, so the period is 10/23=0.43 seconds. The wavelet decomposition was based on samples of 0.1 ms, and the strongest energy is at scale 12 (i.e. $2^{12}$) which is related to a period of 0.4 seconds.

Figure 6:
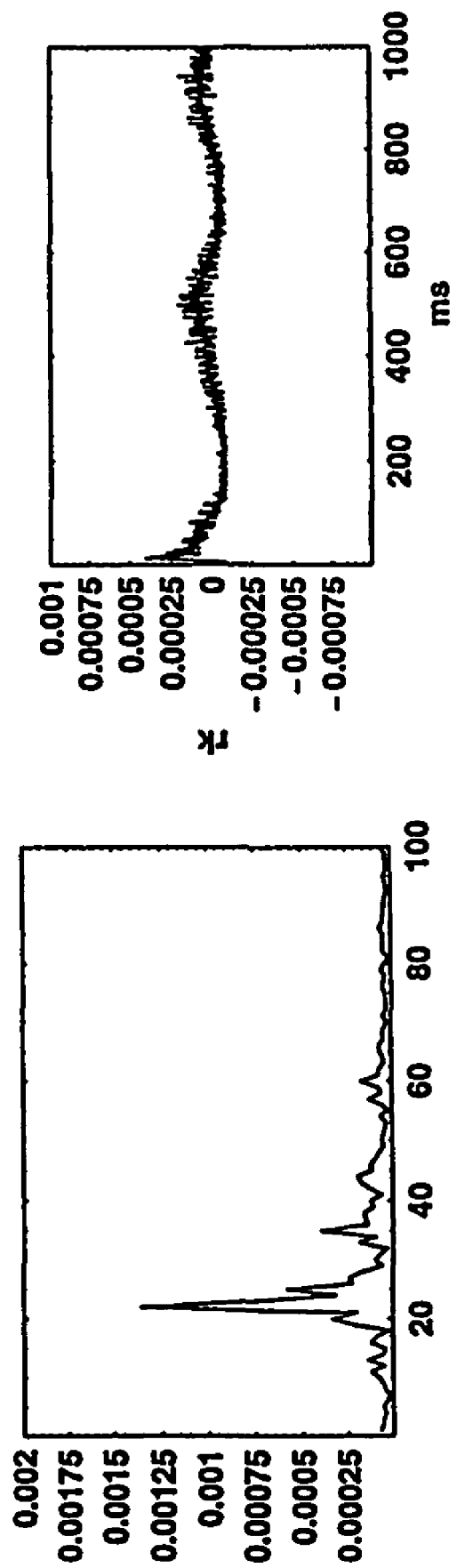
FIG. 6 contains two graphs that describe data analysis for individual marks.

In practice, an individual only sees their own marks, and not the aggregate marks. This sampling produces a noisier signal and FIG. 6 illustrates this degradation of information using the correlogram and periodogram of the individual signals, which have smaller amplitudes than FIG. 5, but similar periods. In other words, the periodic structure remains, but estimating the period is harder for an individual user.

Smooth TCP

Figures 7, 8:
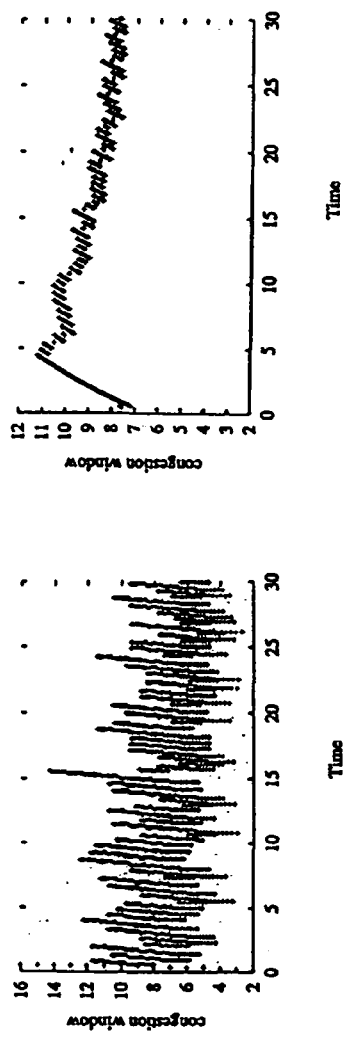
FIG. 7 contains two graphs that describe congestion window evolution in (a) ECN aware TCP and (b) Smooth TCP.
FIG. 8 is a table that describes sent rates and proportion of marked packets for varying number of TCP and Smooth TCP streams.

In congestion avoidance mode, TCP halves its congestion window cwnd when an ECN mark is received, and increases it by 1/cwnd when an unmarked acknowledgement is received. There are many possible ways to adapt these rules so as to reach the same equilibrium point, but in a smoother manner. The one that is used in the example simulation amounts to increasing cwnd by $1/(cwnd)^2$ when receiving an unmarked ACK (a logarithmic rather than linear increase), and decreasing it by ½ when receiving a mark before going into time-out mode (a subtraction, not a multiplicative decrease). Simple fluid models show that this indeed seeks the same equilibrium points as TCP sources, but with an adaptation rate divided by cwnd. The evolution of cwnd for TCP and Smooth TCP is displayed in FIG. 7. This will produce the same throughput if the marking probability is held fixed, but the marking behavior is itself affected by the load, as we conjecture that an aggregate of Smooth TCPs would generate a smoother load, leading to less bursty marking and hence to a lower marking rate for a given throughput.

Consider the same simulation as described above. The fair share for each one of the 50 users is about 72 packets per second. Table 1 (FIG. 8) gives the sent and marked packets as TCP is gradually replaced by smooth TCP. This illustrates how Smooth TCP does smooth the flow, in general increases the utilization with less marks, and typically has less marks and about 8% more throughput than each TCP flow.

Figure 9:
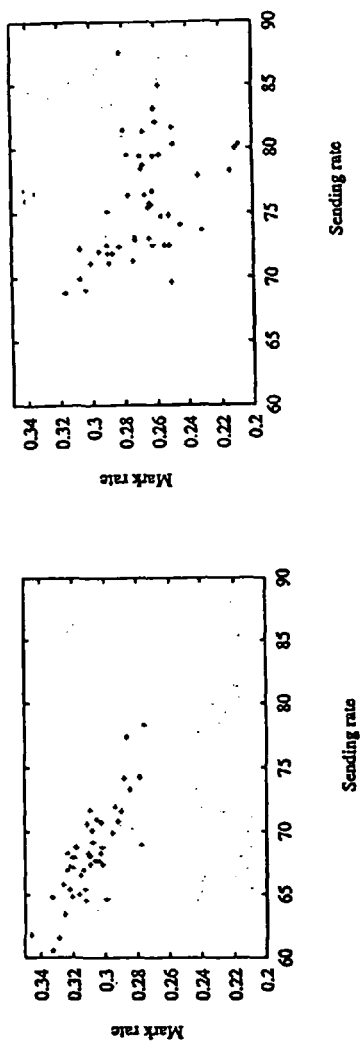
FIG. 9 contains two graphs that describe send and marked rates (a) 49 TCP, 1 Smooth TCP and (b) 1 TCP, 49 Smooth TCP.

The throughputs are stochastic, and FIG. 9 shows the individual sent and mark rates for the 50 flows in the case where 49 are normal TCP flows (left side) and where only one is a normal TCP flow (right side). Despite the variation in the individual values, the improvement achieved by replacing TCP sources by Smooth TCP sources is clear.

Predictive TCP

This section describes the inventive embodiment that provides a prediction scheme that enables end-users to infer, from their feedback history, the current network status. One way to think of the description that is given just below is as follows. As set forth above, network congestion is typically periodic in nature. That is, because of the dynamics of the network environment, congestive periods tend to have a fairly regular and repeatable period. Consider an analogy of a regular square wave that oscillates between 1 and 0, where 1 is considered as congestion and 0 is considered as non-congestion. The inventive approach described below looks at the periodic nature of the network congestion and then predicts the state of the network at some time in the future, based on this periodic nature. Thus, the inventive approach is able to ascertain, with a reasonable degree of certainty, where these square wave 1's and 0's are likely to occur.

Figure 10:
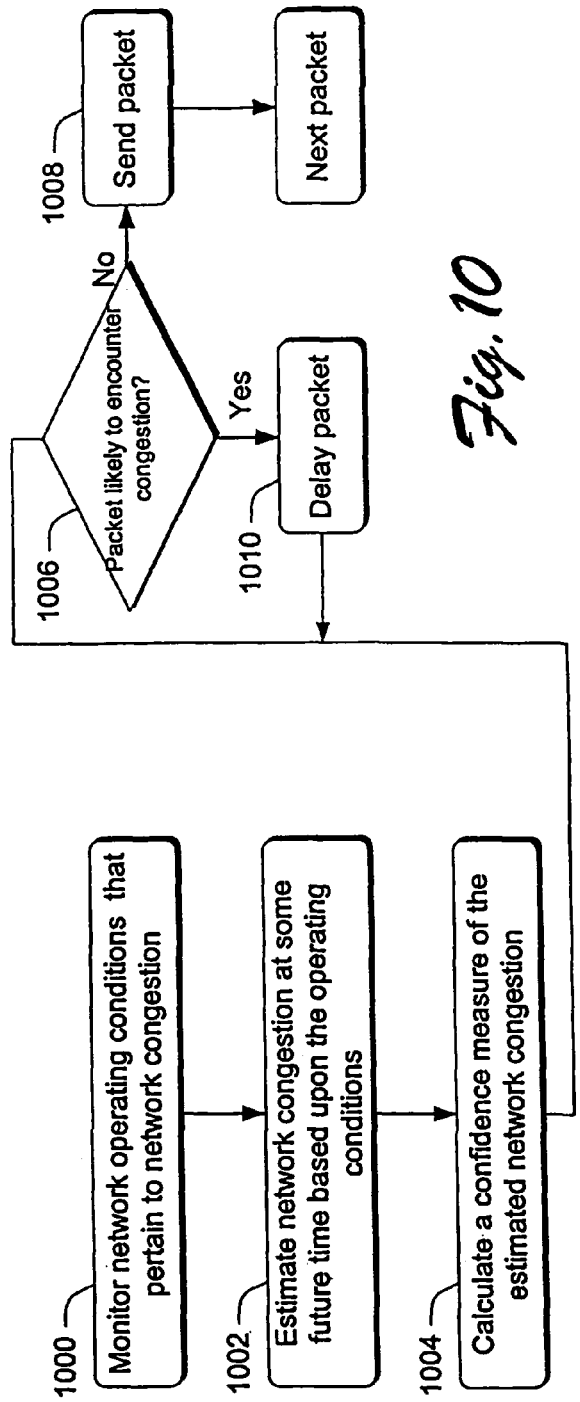
FIG. 10 is a flow diagram that describes steps in a method in accordance with the described embodiment.

FIG. 10 is a flow diagram that describes, generally, processing steps in accordance with the described embodiment. The method can be implemented in any suitable hardware, software, firmware, or combination thereof. In addition, the method can be implemented at any suitable location within a network computing environment, e.g. on a personal computing device, server, etc.

Step 1000 monitors network operating conditions that pertain to or, are indicative in some way of network congestion. These operating conditions can be any suitable conditions that are utilized now, or that might be utilized in the future. These operating conditions are embodied, in the present example, in the form of network feedback which, in the illustrated example, includes, without limitation, binary feedback messages such as packet loss events or notifications, or ECN marks. By monitoring for these conditions, periods of network congestion and non-congestive periods can be ascertained. Step 1002 estimates network congestion at some time in the future based upon the monitored operating conditions. That is, by observing the periods of congestion and non-congestion as evidenced by the operating conditions, the inventive method is able to predict periods of congestion in the future. Step 1004 calculates a confidence measure of the estimated network congestion. Any suitable confidence measure can be used. One particular statistical example of a confidence measure determination is given below. Step 1006 then ascertains whether, in view of the estimated network congestion (and, where appropriate, the confidence in that estimate), a packet is likely to encounter network congestion. If the estimation provided by step 1002 indicates that the packet is not likely to encounter network congestion, then step 1008 sends or transmits the packet. If, on the other hand, the estimation indicates that the packet is likely to be delayed, then step 1010 delays transmission of the packet. The packet can be delayed for any suitable time period, or until it appears that the estimations of the network congestion indicate that congestion will not likely be encountered by the packet. The method advantageously continuously monitors the operating conditions of the network so that the congestion estimates are timely.

Specific Implementation

The following discussion presents but one specific, particular way of implementing a feedback system in which predictive estimations regarding network congestion can be made and used to modify packet transmission activities. It is to be appreciated and understood that this constitutes but one example. Accordingly, other approaches can be utilized without departing from the spirit and scope of the claimed subject matter.

The task of predicting network congestion into the future can generally and mathematically be described as follows: given a set of time instants $t_1 < \ldots < t_n$, and corresponding signals $Y(t_1), \ldots Y(t_n)$ taking values in $\{0,1\}$, how to predict the value of the feedback $Y(t)$ to be received at some later time $t > t_n$? The desired strategies are to be implemented on-line, and thus should try to fit the simplest of patterns to the observed data. Namely, we try to match to the data a periodic profile of the following type:

$$Y(t) = \begin{cases} 0 & \text{if } t - \phi \bmod(\tau_0 + \tau_1) \in [0, \tau_0) \\ 1 & \text{if } t - \phi \bmod(\tau_0 + \tau_1) \in [\tau_0, \tau_0 + \tau_1) \end{cases}$$

In order to forecast the feedback value at a future time t, we rely only on the following four variables, to be computed from the past observations: $\tau_0, \tau_1$ which are respectively, the estimates of the sojourn times in the 0 (uncongested) and 1 (congested) states; last_t, which is the estimate of the last time at which the feedback process changed from one state to another (i.e., jumped from 0 to 1, or from 1 to 0); and finally, last_state, which is the state the feedback process is supposed to have entered at time last_t. Based on these four variables, the following estimate is returned:

$$\hat{Y}(t) = \begin{cases} 0 & \text{if last\_state} = 0 \text{ and } t - \text{last\_tmod}(\tau_0 + \tau_1) \in [0, \tau_0), \\ 0 & \text{if last\_state} = 1 \text{ and } t - \text{last\_tmod}(\tau_0 + \tau_1) \in [\tau_1, \tau_0 + \tau_1), \\ 1 & \text{if last\_state} = 0 \text{ and } t - \text{last\_tmod}(\tau_0 + \tau_1) \in [\tau_0, \tau_0 + \tau_1), \\ 1 & \text{if last\_state} = 1 \text{ and } t - \text{last\_tmod}(\tau_0 + \tau_1) \in [0, \tau_1). \end{cases}$$

The following rules are utilized for updating the variables $\tau_0, \tau_1$, last_t and last_state from new observations, i.e. at some time $t_{n+1}$ where feedback $Y(t_{n+1})$ is given to us. When the newly observed feedback $Y(t_{n+1})$ and the previous one $Y(t)$ coincide, no modification is made. When a state change has occurred, the following updates are made:

if $Y(t_n) = 0$ and $Y(t_{n+1})$
$$= 1 \begin{cases} \tau_0 = (1-\varepsilon)\tau_0 + \varepsilon * (t_n + t_{n+1})/2 - \text{last\_t}); \\ \text{last\_t} = (t_n + t_{n+1})/2; \\ \text{last\_state} = Y(t_{n+1}); \end{cases}$$

if $Y(t_n) = 1$ and $Y(t_{n+1})$
$$= 0 \begin{cases} \tau_1 = (1-\varepsilon)\tau_1 + \varepsilon * ((t_n + t_{n+1})/2 - \text{last\_t}) \\ \text{last\_t} = (t_n + t_{n+1})/2; \\ \text{last\_state} = Y(t_{n+1}); \end{cases}$$

The motivation behind these equations is the following: given the two observations, say 0 and 1 at $t_n$ and $t_{n+1}$, we assume only one state change in the feedback that has occurred between these two instants, and moreover, that it has occurred exactly at $(t_n+t_{n+1})/2$, the middle point. From this, we assume we have observed a sojourn time in state 0 of exactly $(t_n+t_{n+1})/2-$last_t; the update rule for $\tau_0$ is then the classical exponentially weighted moving average (EWMA) estimate of some assumed "true" sojourn time in state 0. The parameter $\varepsilon$ could in principle take any value between 0 and 1. Taking it equal to 1 always uses the last sample as the current estimate. This is suitable in many situations where synchronization is such that most samples take the same value.

Thus, the processing described just above enables predictions of the likelihood that network congestion will be experienced at some time in the future. The inventive approach characterizes a profile that is associated with observable network congestion in terms of various parameters that are associated with the congestion. Based on this characterization, the profile of the congestion is projected mathematically into the future. As will be seen below, this projection of the congestion profile can then serve as the basis for altering user behavior, e.g. packet transmission.

Confidence Measures

Figure 11:
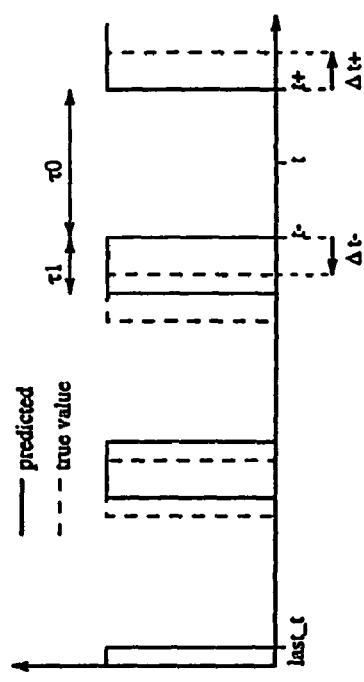
FIG. 11 is a graph that illustrates predicted values versus actual values in accordance with the described embodiment.

In order to complement the above approach, in addition to predicting a value $\hat{Y}(t)$, it has been found helpful to provide a measure of the confidence that one has in this prediction or estimation. In order to do so, we shall update estimates of the variances of the sojourn times in the states 0 and 1. Updates occur at times when a change of state is observed, and are done according to the EWMA equation, which will be understood and appreciate by those skilled in the art:

if $Y(t_n)=0$ and $Y(t_{n+1})=1$, $V_0=(1-\varepsilon')V_0+\varepsilon'*((t_n+t_{n+1})/2-$
last_$t-\tau_0)^2$, if $Y(t_n)=1$ and $Y(t_{n+1})=0$, $V_1=(1-\varepsilon')$
$V_1+\varepsilon'*((t_n+t_{n+1})/2-$last_$t\_\tau_1)^2$ Note that the parameter $\varepsilon'$ might differ from the previous parameter $\varepsilon$; indeed, in all the experiments reported in this document, $\varepsilon'=\frac{1}{2}$. We now evaluate the confidence we have in the estimate $\hat{Y}(t)$ given by the equation above. In doing so, the following statistical assumptions are made: the successive marking periods are iid, with mean $\tau_1$ and variance $V_1$, and independent of the subsequent non-marking periods, which are again iid, with mean $\tau_0$ and variance $V_0$. In addition, it is assumed that a change in state occurred exactly at last_t. The estimate $\hat{Y}(t)$ would be fully reliable if the alternating marking and non-marking periods from last_t until t lasted for exactly their expected durations. Consider, for example, the situation depicted in FIG. 11, where the estimate $\hat{Y}(t)=0$ is returned, because it is assumed that t lies in an interval $[t^-, t^+)$ corresponding to a non-marking period. However, when their probability distribution has positive variance, the marking and non-marking time intervals will differ from their expected value. Again, from the example of FIG. 11, the non-marking period assumed to coincide with $[t^-, t^+]$ has slightly different end-points, i.e., it consists of $[t^-+\Delta t^-, t^++\Delta t^+]$. Here, under the statistical assumptions that have been made, the random variable $\Delta t^-, \Delta t^+$ have respective variances $V^-=2(V_0+V_1)$ and $V^+=2(V_0+V_1)+V_0$. The prediction $\hat{Y}(t)=0$ will surely be correct provided the following conditions hold:

$$\Delta t^- < t - t^-, \text{ and } \Delta t^+ > t - t^+.$$

By using Tchebitchev's inequality, the probability that these events do not occur is bounded above by:

$$P(\Delta t^- \geq t - t^-) \leq \frac{V^-}{(t-t^-)^2},$$

$$P(\Delta t^+ \leq t - t^+) \leq \frac{V^+}{(t-t^+)^2}.$$

If we make the further assumption that the distributions of the $\Delta t$ variables is symmetric around zero, these upper bounds can be further divided by 2. Note also that the two events considered are mutually exclusive so that that probability of their union equals the sum of their probabilities.

Summarizing, we get the following estimate:

$$P(\hat{Y}(t) = Y(t)) \geq 1 - p^- - p^+.$$

where $p^- = \frac{V^-}{2(t-t^-)^2}$, $p^+ = \frac{V^+}{2(t-t^+)^2}$.

Figure 12:
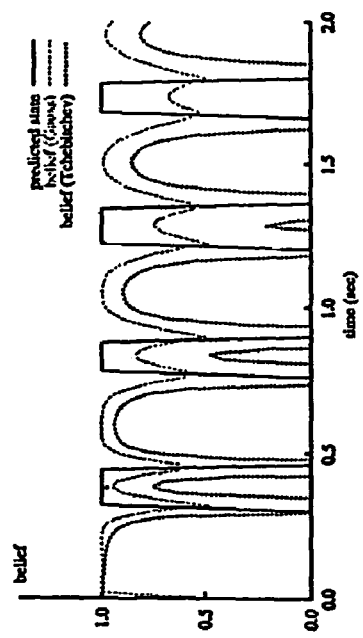
FIG. 12 is a graph that illustrates predicted values and associated belief, based on Tchebitchev inequality and Gaussian distribution.

Formulas for the parameters $t^\pm$, and $V^\pm$ are easily derived, so that this bound can effectively be computed. The resulting bounds, relying on the Tchebitchev inequality, may be quite loose. Sharper bounds are obtained by assuming the marking and non-marking durations are distributed according to a fixed probability distribution. For instance, assuming these durations are Gaussian, tighter bounds can be computed from quantiles of the standard normal distribution. The estimate $\hat{Y}(t)$ together with the lower bounds on the probability that it is correct (thin line), which are a measure of the belief in the estimate $\hat{Y}(t)$, resulting from either Tchebitchev inequality or Gauss distribution are plotted on FIG. 12.

Exemplary Congestion Control Application

The above-described method can be implemented in connection with end-user control systems that can advantageously affect performance. As will be seen, the inventive method can impact the performance for not only so-called "oscillation aware" users, but also user that are not "oscillation aware" as well.

Passive Predictor

Consider first the case when all 50 sources use standard ECN-aware TCP, and add a Predictor module to one source, which stores the values of $\tau_0, \tau_1$, last_t, last_state, $V_0$, and $V_1$, computed according to the previously described approach. However, this source decides when to send packets according to its TCP module, with no influence from the Predictor module.

Figure 13:
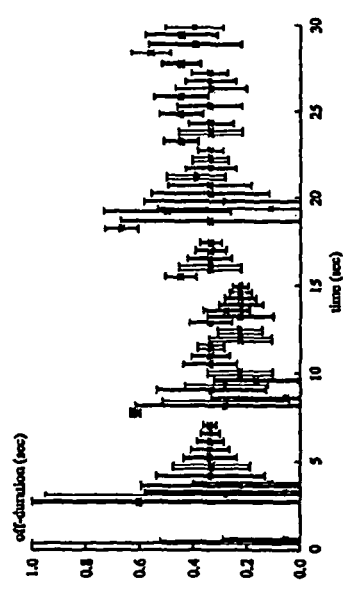
FIG. 13 is a graph that illustrates confidence intervals and estimates for $\tau_0$, gathered by a passive predictor.
Figure 14:
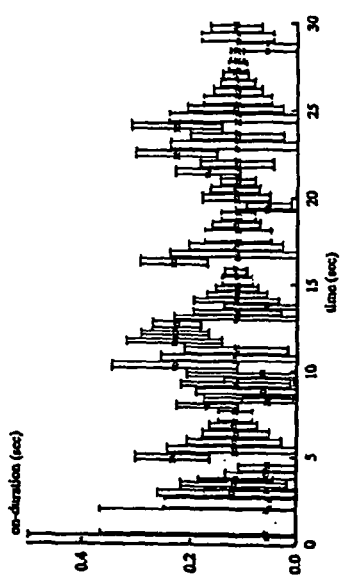
FIG. 14 is a graph that illustrates confidence intervals and estimates for $\tau_1$, gathered by a passive predictor.

FIGS. 13 and 14 show the successive estimates of $\tau_0$, $\tau_1$, respectively, with error bars of width $\sqrt{2V_0}$, $\sqrt{2V_1}$ respectively. It clearly appears that the observed marking and non-marking durations coincide most of the time with a fixed value, which is an indication that the marking periods should be predictable. For instance, the marking durations typically last for 0.1 second, which is the round trip propagation delay of all 50 sources.

Figure 15:
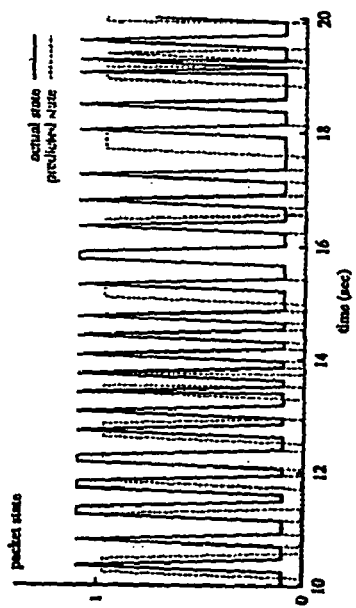
FIG. 15 is a graph that illustrates actual and predicted states, gathered by a passive predictor.
Figure 16:
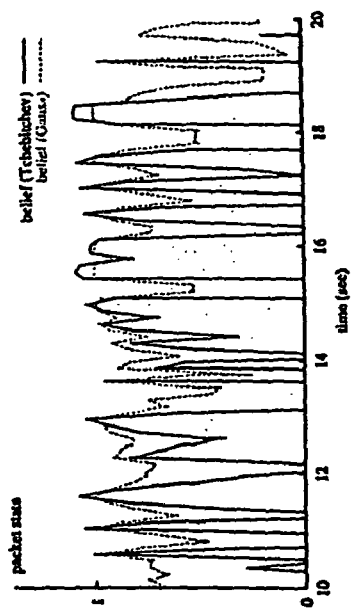
FIG. 16 is a graph that illustrates beliefs of predictions made by a passive predictor.

FIG. 15 displays the predicted and actual states of the packets sent by the tagged source, and FIG. 16 shows the associated belief.

Active Predictor

Now, a number of the sources are modified, denoted in further discussion as "Pred TCP" sources, in the following way. The sources still implement TCP, but when a packet would normally be sent at time t, TCP asks the predictor if this packet is likely to be marked. If the predicted value $\hat{Y}(t)$ equals 1, and if the predictor is confident about this, i.e. if the quantities $p^-$ and $p^+$ computed as described above verify $p^-+p^+<\sigma$, for some confidence level $\sigma$, the TCP is not entitled to send the packet, and has to wait for the next time when the predictor is no longer confident that a mark will be incurred.

Figures 17, 18:
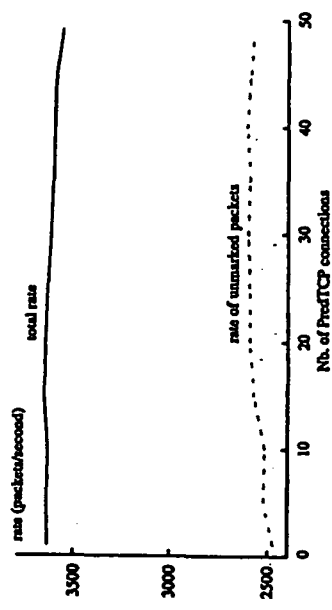
FIG. 17 is a table that describes sent rates and proportion of marked packets for varying number of TCP and PredTCP streams.
FIG. 18 is a graph that describes global rates for varying numbers of PredTCP sources.

FIG. 17 is a table that illustrates the impact of replacing TCP sources by Pred TCP sources.

FIG. 18 is a graph of the global rates for varying numbers of Pred TCP sources. Notice that, although replacing TCP sources with Pred TCP sources marginally reduces the overall utilization, it increases the rate at which packets not receiving marks are sent.

Figure 19:
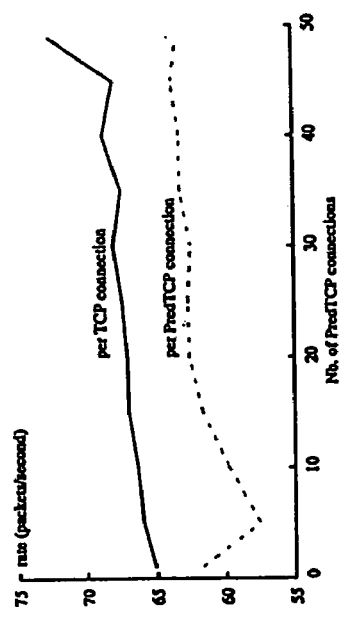
FIG. 19 is a graph that describes individual rates for varying numbers of PredTCP sources.
Figure 20:
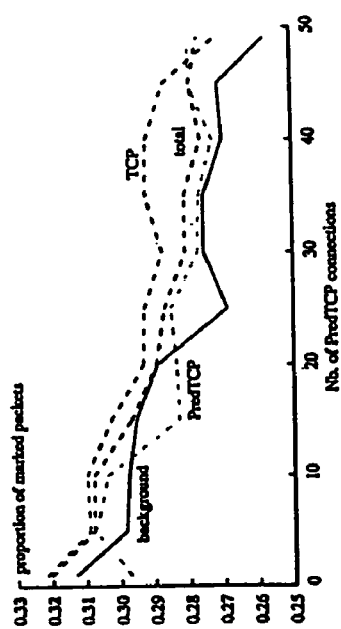
FIG. 20 is a graph that describes marking rates for varying numbers of PredTCP sources.

FIG. 19 is a graph of the individual rates for varying numbers of Pred TCP sources. Notice that the graph indicates that by replacing TCP sources with Pred TCP sources, both the TCP sources and the Pred TCP sources increase their sending rate. Finally, FIG. 20 illustrates the impact of replacing TCP sources by Pred TCP sources on the marking rates. In particular, Pred TCP sources get a slightly smaller marking rate than TCP sources do, but their introduction lowers the marking rate achieved by the TCP sources. Hence, the experimental results show that it is possible to achieve an improvement on TCP by getting a smaller marking rate, while still being "TCP-friendly", in that the improvement is shared with the TCP sources. Note also that reactivity has not been sacrificed, as was the case with Smooth TCP. Interestingly, FIG. 20 shows that background traffic typically receives the smallest marking rate. Hence, lack of reactivity seems to pay here as it did with Smooth TCP.

Figure 21:
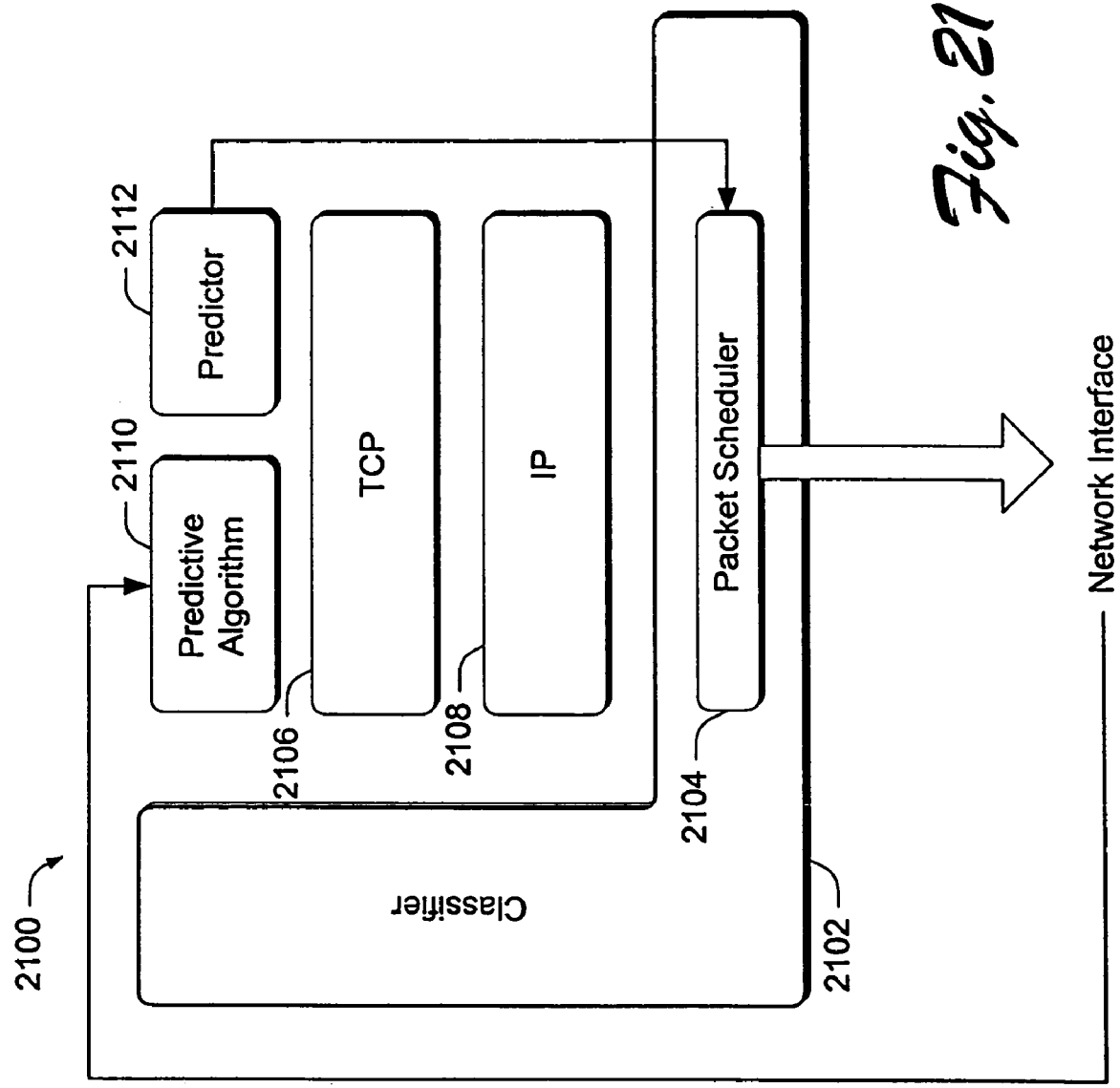
FIG. 21 is a diagram illustrating a protocol layering scheme in accordance with the described embodiment.

FIG. 21 shows a protocol layering scheme 2100 that describes the conceptual layering of various components in an exemplary predictive system. A packet classifier 2102 includes a packet scheduler 2104 that schedules packets for sending over a network, such as the Internet. TCP 2106 resides above IP 2108 in the layering scheme and generates IP packets that are scheduled by the packet scheduler 2104 on the network interface. A predictive algorithm component 2110 resides above TCP 2106 and operates as described above in connection with information that is received from the network. A predictor module 2112 is linked with the packet scheduler 2104 so that information developed by the predictor can be used by the packet scheduler 2104 to delay or schedule packets relative to the predicted congestion situation. This allows TCP to operate as usual—that is, TCP simply creates the packets for transmission which are then managed by the packet scheduler 2104. The packet scheduler 2104 then reacts to the information that is provided to it by the predictor 2112.

It is to be understood that the above-described system can be utilized in connection with other protocols, and not necessarily just TCP, e.g. ECN streaming protocols and the like.

The embodiment described above thus enables prediction of congestion periods in a telecommunications network, such as the Internet, so that the rate at which data is sent into the network can be altered. One benefit to the end-system or end-user is an improved "goodput" (effective throughput); and, the benefit to the network is improved efficiency/utilization and overload prevention. If congestion were mediated to the user via some form of congestion pricing, then the benefit to the user would also be a decreased price for a given throughput.

The embodiment described above can be implemented in a number of ways. For example, an application can be provided on a computer which reacts to congestion information in the form of lost packets, or in a specific implementation, ECN marks, by predicting congestion intervals and sending packets at a low rate 7 when congestion is predicted, and at a higher rate when the congestion is unlikely. Alternately, a programmed device can be provided between a computer (or a plurality of computers, a LAN, etc.) and a network, and estimate congestion periods, and interrupt the sending rate of the computer (or plurality of computers, LAN, etc.). In a specific implementation, this could be achieved by delaying the acknowledgement (ACKs) of packets at the transport layer. This is can be applicable to a single channel or an aggregate of channels.

CONCLUSION

The described embodiment can be utilized to reduce oscillations in network 17 resource utilization by modifying the congestion avoidance behavior of some sources. By introducing modified sources, benefits can be enjoyed by all sources—even those that still use standard TCP implementations.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of processing data packets, the method implemented at least in part by one or more computing devices and comprising:
predicting network congestion, wherein said predicting comprises:
receiving feedback from a network;
generating, based on the received feedback, a periodic profile of congestion on the network, the periodic profile reflecting at least one previous congested interval of time when the feedback indicated the network was congested, and a previous noncongested interval of time when the feedback indicated the network was not congested;
estimating an expected congested interval of time when congestion is expected on the network and an expected noncongested interval of time when congestion is not expected on the network, the expected congested interval and the expected noncongested interval being subsequent to the previous congested interval and the previous noncongested interval;

determining, based on the periodic profile, whether to transmit a data packet at a future time t, the determining comprising:

when t falls within the estimated noncongested interval, transmitting the data packet at time t; and when t falls within the estimated congested interval, delaying transmission of the data packet until after the estimated congested interval, wherein the length of the expected congested interval corresponds to the length of the previous congested interval, and the length of the expected noncongested interval corresponds to the length of the previous noncongested interval.

2. The method of claim 1, wherein said feedback comprises binary feedback messages.

3. The method of claim 1, wherein said feedback comprises data pertaining to packet loss events.

4. The method of claim 1, wherein said feedback comprises data pertaining to early congestion notification (ECN) marks.

5. The method of claim 1, wherein the one or more computing devices comprise an end-user's computer configured to perform at least the delaying.

6. The method of claim 5, wherein the congestion on the network is periodic in nature.

7. The method of claim 1, wherein the data packet is generated in accordance with transmission control protocol (TCP).

8. One or more computer-readable storage media having computer-executable instructions thereon which, when executed by the one or more computing devices, implement the method of claim 1.

9. The one or more computing devices, configured to implement the method of claim 1.

10. The one or more computing devices of claim 9, wherein the one or more computing devices comprise at least one server.

11. The one or more computing devices of claim 9, wherein the one or more computing devices comprise at least one network device configured for placement between one or more end user computers and a network.

12. One or more computer-readable storage media having computer-executable instructions thereon which, when executed by one or more end user computers, cause the computer(s) to:

monitor operating conditions on a network, the operating conditions reflecting oscillatory periods of congestion and non-congestion on the network;

match the operating conditions to a periodic profile, the periodic profile reflecting past observations of the oscillatory periods of congestion and non-congestion;

predict a future network state based on the periodic profile, the future network state being a state of predicted congestion or a state of predicted non-congestion;

determine whether at least one data packet is likely to be transmitted in the state of predicted congestion; and delay transmission of the at least one data packet from an end user's computer, provided the at least one data packet is likely to be transmitted in the state of predicted congestion unless the transmission is delayed.

13. A method of operating within a network, the method implemented at least in part by one or more computing devices and comprising:

monitoring network operating conditions that pertain to network congestion;

based on the monitoring, obtaining a profile reflecting a pattern of the network congestion over time, the pattern including at least one measured period of congestion and at least one measured period of noncongestion on the network;

estimating network congestion at some time in the future based upon the profile, wherein the estimated network congestion comprises:

at least one future period of estimated noncongestion on the network having a time period based on the measured period of noncongestion; or at least one future period of estimated congestion on the network having a time period based on the measured period of noncongestion.

14. The method of claim 13, wherein the one or more computing devices comprise an end user's computer configured to perform at least the monitoring.

15. The method of claim 13, wherein said monitoring comprises receiving feedback from the network.

16. The method of claim 15, wherein said feedback comprises binary feedback messages.

17. The method of claim 15, wherein said feedback comprises data pertaining to packet loss events.

18. The method of claim 15, wherein said feedback comprises data pertaining to early congestion notification (ECN) marks.

19. The method of claim 13, wherein said network operating conditions pertain to congestion that has a periodic nature.

20. The method of claim 13 further comprising calculating a confidence measure of the estimated network congestion, the confidence measure providing a degree of confidence that network congestion will occur at said time in the future.

21. The method of claim 20 further comprising ascertaining, in view of the estimated network congestion and the confidence measure, whether a data packet is likely to encounter network congestion.

22. The method of claim 21 further comprising transmitting the data packet when network congestion is not likely, and delaying transmission of the data packet when network congestion is likely.

23. The method of claim 13 further comprising ascertaining, in view of the estimated network congestion, whether a data packet is likely to encounter network congestion.

24. The method of claim 23 further comprising transmitting the data packet when network congestion is not likely, and delaying the data packet when network congestion is likely.

25. One or more computer-readable storage media having computer-executable instructions thereon which, when executed by the one or more computing devices, implement the method of claim 13.

26. The one or more computing devices, configured to implement the method of claim 13.

27. A method of operating within a network comprising:

monitoring, with an end-user's computer, network operating conditions that pertain to network congestion;

computing variables based on the monitored network operating conditions, wherein the computed variables include estimates of sojourn times in uncongested and congested states;

estimating network congestion at some time in the future based upon one or both of: the monitored operating conditions or the computed variables;

calculating a confidence measure of the estimated network congestion by updating the estimates of the sojourn times in the uncongested and congested states according to an exponentially weighted moving average equation, the confidence measure providing a degree of confidence that network congestion will occur at said time in the future;

ascertaining, in view of the estimated network congestion and the confidence measure, whether a data packet to be sent from the end-user's computer is likely to encounter network congestion; and transmitting the data packet when network congestion is not likely, otherwise, delaying the data packet when network congestion is likely.

28. One or more computer-readable storage media having computer-executable instructions thereon which, when executed by one or more end user computers, cause the computer(s) to:

monitor network operating conditions that pertain to network congestion by receiving feedback from the network in the form of binary messages;

compute variables based on the monitored network operating conditions, wherein the computed variables include estimates of sojourn times in uncongested and congested states;

estimate network congestion at some time in the future based upon one or both of: the monitored operating conditions or the computed variables;

calculate a confidence measure of the estimated network congestion by updating the estimates of the sojourn times in the uncongested and congested states according to an exponentially weighted moving average equation, wherein the confidence measure provides a degree of confidence that network congestion will occur at said time in the future;

ascertain, in view of the estimated network congestion and the confidence measure, whether a data packet is likely to encounter network congestion; and transmit the data packet when network congestion not likely, otherwise delay the data packet when network congestion is likely.

29. A method of processing data packets, the method implemented at least in part by one or more computing devices and comprising:

observing sojourn times of the data packets on a network, including at least a first sojourn time for a first individual data packet in an uncongested state and a second sojourn time for a second individual data packet in a congested state;

summing at least the first sojourn time and the second sojourn time;

determining an expected time when a third individual data packet is to be transmitted;

performing a modulus operation of the expected time with respect to the sum of the first sojourn time and the second sojourn time to obtain a result; and delaying transmission of the third individual data packet when the result of the modulus operation indicates the third individual data packet will encounter congestion if transmitted at the expected time.

30. The method of claim 29, wherein the one or more computing devices comprise an end user's computer configured to perform at least the delaying.

31. One or more computer-readable storage media having computer-executable instructions thereon which, when executed by the one or more computing devices, implement the method of claim 29.

32. A system comprising:

one or more protocol modules for generating data packets that are to be sent over a network;

a packet scheduler for scheduling the data packets for transmission over the network; and a predictor module configured to:

monitor network operating conditions that pertain to periodic oscillations of network congestion; and estimate network congestion at some time in the future based upon whether, at the time in the future, the network congestion is likely to have oscillated to a congested state or to an uncongested state, the predictor module further configured to provide information to the packet scheduler that can be used by the packet scheduler to delay packet transmission when there is a likelihood of network congestion at said time in the future.

33. The system of claim 32 embodied on an end-user's computer.

34. The system of claim 32 not embodied on an end-user's computer.

35. The system of claim 32 embodied between an end-user's computer and the network.

36. The system of claim 32, wherein the one or more protocol modules comprise a transmission control protocol (TCP) module.

37. The system of claim 32, wherein the network comprises the Internet.

* * * * *